(12) United States Patent
Lundin et al.

(10) Patent No.: US 9,740,712 B2
(45) Date of Patent: Aug. 22, 2017

(54) SYSTEM FOR PROCESSING IMAGE DATA, STORING IMAGE DATA AND ACCESSING IMAGE DATA

(71) Applicant: Ab Minenda Oy, Grankulla (FI)

(72) Inventors: Johan Lundin, Grankulla (FI); Mikael Lundin, Ekenäs (FI)

(73) Assignee: AB MINENDA OY, Grankulla (FI)

(*) Notice: Subject to any disclaimer, the term of this patent is extended or adjusted under 35 U.S.C. 154(b) by 0 days.

(21) Appl. No.: 13/975,686

(22) Filed: Aug. 26, 2013

(65) Prior Publication Data

US 2015/0055890 A1    Feb. 26, 2015

(51) Int. Cl.
*G06T 11/60* (2006.01)
*G06T 3/40* (2006.01)
*G06F 17/30* (2006.01)
*G06F 3/0488* (2013.01)

(52) U.S. Cl.
CPC .... *G06F 17/3028* (2013.01); *G06F 17/30017* (2013.01); *G06F 17/30274* (2013.01); *G06T 3/40* (2013.01); *G06T 3/4038* (2013.01); *G06T 11/60* (2013.01)

(58) Field of Classification Search
CPC ..... G06T 11/60; G06T 7/0081; G06T 3/4038; G06T 3/40; G09G 5/14; G09G 2340/0407; G09G 5/391; G06F 17/30265; G06F 17/30017; G06F 3/0481; G06F 9/4443; G06F 3/04883

USPC ......... 345/619, 629–641, 660–671; 382/173, 382/284, 293, 298, 305, 306; 715/764–767, 788, 800, 863, 864
See application file for complete search history.

(56) References Cited

U.S. PATENT DOCUMENTS

| | | | |
|---|---|---|---|
| 8,174,523 B2* | 5/2012 | Higuchi | G06F 3/0483 345/418 |
| 2004/0160462 A1* | 8/2004 | Sheasby et al. | 345/788 |
| 2008/0205694 A1* | 8/2008 | Sagoo et al. | 382/100 |
| 2010/0005418 A1* | 1/2010 | Miyazaki | G06F 3/04883 715/823 |
| 2010/0275152 A1* | 10/2010 | Atkins et al. | 715/788 |
| 2011/0153602 A1* | 6/2011 | Kiddle | G06F 17/30029 707/731 |
| 2014/0098140 A1* | 4/2014 | Tran | G09G 5/00 345/660 |
| 2014/0282099 A1* | 9/2014 | Bronder et al. | 715/753 |

* cited by examiner

*Primary Examiner* — Ke Xiao
*Assistant Examiner* — Andrew Shin
(74) *Attorney, Agent, or Firm* — Ziegler IP Law Group, LLC

(57) ABSTRACT

A system for processing image data, storing image data and accessing image data is provided. The system includes computing hardware, and one or more databases in communication with the computing hardware for storing image information. Upon receiving user instructions, the computing hardware is operable to combine a plurality of images to create a montage of mutually abutting images arranged within a pre-defined geometrical spatial envelope. The system is operable to manage the montage effectively as a single file for purposes of storing in the databases, and/or accessing from the databases.

19 Claims, 10 Drawing Sheets

SYSTEM FOR PROCESSING IMAGE DATA, STORING IMAGE DATA AND ACCESSING IMAGE DATA

TECHNICAL FIELD

The present disclosure generally relates to systems for processing images, and more specifically, to systems for processing image data, storing image data and accessing image data. Moreover, the present disclosure relates to methods of using the systems for processing image data, storing image data and accessing image data. Furthermore, the present disclosure also relates to software products recorded on non-transitory machine-readable data storage media, wherein the software products are executable upon computing hardware to implement the aforesaid methods.

BACKGROUND

With advent of digital cameras, it has become easier to capture a large number of images. Users often upload images captured by their digital cameras on their computing devices, and save the images in folders.

Problems arise when users wish to browse through their images or create a backup of their images or share their images with other users, as these images may be stored in different folders in different computing devices. Moreover, a typical computing device may have hundreds of folders that may have images that may have been captured by several users over a span of several years. To add to the problems, some images may have been repeated in several of these folders.

Known conventional systems for storing, organizing and sharing images allow a user to create folders of images based on one or more of:
(a) time when the images were captured,
(b) certain events, such as wedding, birthday, etc., where the images were captured,
(c) certain locations where the images were captured, and/or
(d) metadata, such as tags, pertaining to the images.

However, the known conventional systems fail to solve the problems faced by users. Firstly, the known conventional systems are based on a concept of linear time. Secondly, browsing through folders of images is time-consuming. This, in turn, hampers sharing of images freely. Thirdly, users find it difficult to create a backup of their images.

Therefore, there exists a need for a system for processing image data, storing image data and accessing image data in an effective manner, as compared to the known conventional systems.

BRIEF SUMMARY

The present disclosure seeks to provide a system for processing image data, storing image data and accessing image data.

The present disclosure also seeks to provide a method of using the system thereof.

In one aspect, embodiments of the present disclosure provide a system for processing image data, storing image data and accessing image data. The system includes computing hardware that is operable to execute one or more software products recorded on machine-readable data storage media, and one or more databases in communication with the computing hardware for storing image information.

Upon receiving user instructions, the computing hardware is operable to combine a plurality of images to create a montage of mutually abutting images arranged within a pre-defined geometrical spatial envelope.

The pre-defined geometrical spatial envelope may, for example, include at least one of: a spiral form, a heart form, a snake form, a symmetrical or asymmetrical geometrical form, a user-defined form, a form generated by an image analysis algorithm (e.g. edge detection of hand-written or drawn shapes or patterns such as a company logo in an image), a two-dimensional (2-D) form, and/or a three-dimensional (3-D) form. Optionally, the pre-defined geometrical spatial envelope may be any random form. Optionally, the pre-defined geometrical spatial envelope may be a user-controllable form.

Moreover, the pre-defined geometrical spatial envelope may be formed in a manner that is visually conformable and optimal for human visual memory.

Beneficially, the plurality of images may be spatially distributed within the pre-defined geometrical spatial envelope as a function of their time of creation and/or their subject matter.

Beneficially, the computing hardware may be operable to record metadata associated with one or more images included in the montage.

The system is operable to manage the montage effectively as a single file for purposes of storing in the databases, and/or accessing from the databases. Beneficially, the computing hardware may be operable to cause the montage to be stored as a single large file in the databases. Term "database" in the specification should be understood in broad manner to include database arrangements such as implemented with MySQL®, Oracle® database, SQL etc. i.e. any relational or non-relational database as well as file systems. A term file system can refer to storage of digital objects such as images in a storage media as files. Files can be further organized for example to folders or archives. As an example the montage image could be stored in a file system as an image file and related metadata could be stored in a MySQL database.

Moreover, the system may be operable to host an image browser for allowing a user to view the montage. The image browser may enable zooming-in and zooming-out, when viewing the montage. Beneficially, individual images of the montage may be able to be viewed and manipulated by the user within the montage, when zooming-in.

Beneficially, the system may receive user instructions for zooming-in and zooming-out by way of a tactile gesture applied by the user to a touch screen coupled to the computing hardware and/or by way of a user gesture as sensed by a camera coupled to the computing hardware. Additionally the system may receive user instructions via mouse, keyboard, remote controller, game controller/game pad etc.

Moreover, the system enables the user to update the montage by adding new images to the montage at a later time.

Moreover, the system enables the user to merge and/or organize one or more existing montages.

Furthermore, the system may be implemented in various ways, depending on various possible scenarios. In one example scenario, the system may be implemented by way of a spatially collocated arrangement of the computing hardware and the databases. In another example scenario, the system may be implemented by way of a spatially distributed arrangement of the computing hardware and the databases coupled mutually in communication via a data communication network. In yet another example scenario, the computing hardware and the databases may be implemented via cloud computing services. In still another example scenario, the computing hardware and the databases may be implemented via users' portable computing devices.

In another aspect, embodiments of the present disclosure provide a method of using the system for processing image data, storing image data and accessing image data.

In yet another aspect, embodiments of the present disclosure provide a software product recorded on non-transitory machine-readable data storage media, wherein the software product is executable upon computing hardware for implementing the aforementioned method.

Embodiments of the present disclosure substantially eliminate the aforementioned problems in the prior art, and enable users to create a montage of mutually abutting images, and to manage the montage as a single large file, thereby enabling the user to create a backup of the montage easily; and enables users to update, merge and/or organize existing montages easily.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
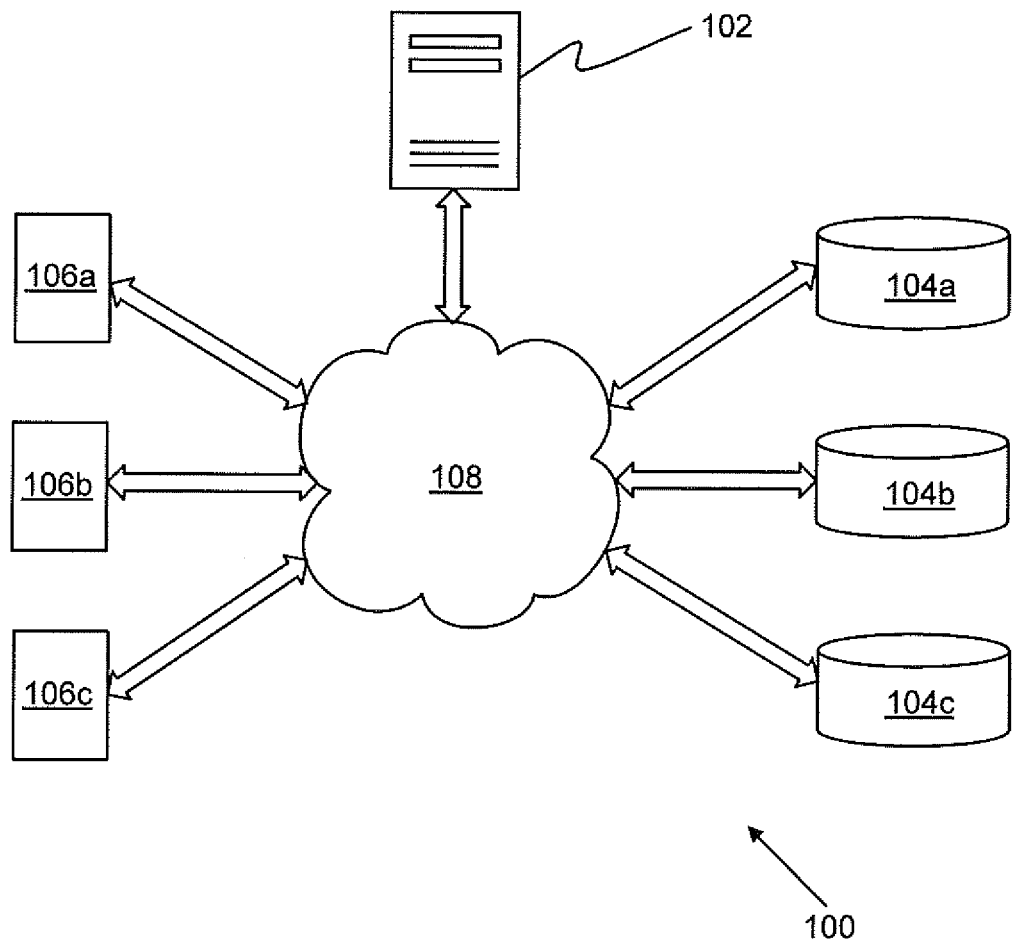
FIG. 1 is a schematic illustration of a system for processing image data, storing image data and accessing image data, in accordance with a first embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which it can be implemented. Although the best mode of carrying out the present disclosure has been disclosed, those in the art would recognize that other embodiments for carrying out or practicing the present disclosure are also possible.

Embodiments of the present disclosure provide a system for processing image data, storing image data and accessing image data. The system includes computing hardware that is operable to execute one or more software products recorded on machine-readable data storage media, and one or more databases in communication with the computing hardware for storing image information.

Upon receiving user instructions, the computing hardware is operable to combine a plurality of images to create a montage of mutually abutting images arranged within a pre-defined geometrical spatial envelope.

The pre-defined geometrical spatial envelope may, for example, include at least one of: a spiral form, a heart form, a snake form, a symmetrical geometrical form, a user-defined form, a form generated by an image analysis algorithm (e.g. edge detection of hand-written or drawn shapes or patterns such as a company logo in an image), a two-dimensional (2-D) form, and/or a three-dimensional (3-D) form. Optionally, the pre-defined geometrical spatial envelope may be any random form. Optionally, the pre-defined geometrical spatial envelope may be a user-controllable form.

Moreover, the pre-defined geometrical spatial envelope may be formed in a manner that is visually conformable and optimal for human visual memory.

Beneficially, the plurality of images may be spatially distributed within the pre-defined geometrical spatial envelope as a function of their time of creation and/or their subject matter.

Beneficially, the computing hardware may be operable to record metadata associated with one or more images included in the montage.

The system is operable to manage the montage effectively as a single file for purposes of storing in the databases, and/or accessing from the databases. Beneficially, the computing hardware may be operable to cause the montage to be stored as a single large file in the databases. Term "database" in the specification should be understood in broad manner to include database arrangements such as implemented with MySQL®, Oracle® database, SQL etc. i.e. any relational or non-relational database: The term "database" can also refer to file systems. A term file system can refer to storage of digital objects such as images in a storage media as files. Files can be further organized for example to folders or archives. As an example the montage image could be stored in a file system as an image file and related metadata could be stored in a MySQL database.

Moreover, the system may be operable to host an image browser for allowing a user to view the montage. The image browser may enable zooming-in and zooming-out, when viewing the montage. Beneficially, individual images of the montage may be able to be viewed and manipulated by the user within the montage, when zooming-in.

Beneficially, the system may receive user instructions for zooming-in and zooming-out by way of a tactile gesture applied by the user to a touch screen coupled to the computing hardware and/or by way of a user gesture as sensed by a camera coupled to the computing hardware. Additionally the system may receive user instructions via mouse, keyboard, remote controller, game controller/game pad etc.

Furthermore, the system may be implemented in various ways, depending on various possible scenarios. In one example scenario, the system may be implemented by way of a spatially collocated arrangement of the computing hardware and the databases. In another example scenario, the system may be implemented by way of a spatially distributed arrangement of the computing hardware and the databases coupled mutually in communication via a data communication network. In yet another example scenario, the computing hardware and the databases may be implemented via cloud computing services. In still another example scenario, the computing hardware and the databases may be implemented via users' portable computing devices.

Referring now to the drawings, particularly by their reference numbers, FIG. 1 is a schematic illustration of a system 100 for processing image data, storing image data and accessing image data, in accordance with a first embodiment of the present disclosure. The system 100 includes computing hardware 102 and one or more databases for storing image information, depicted as a database 104a, a database 104b and a database 104c in FIG. 1 (hereinafter collectively referred to as databases 104). The system 100 also includes one or more computing devices associated with one or more users, depicted as a computing device 106a, a computing device 106b and a computing device 106c in FIG. 1 (hereinafter collectively referred to as computing devices 106). In addition, the system 100 includes one or more data communication networks, depicted as a data communication network 108 in FIG. 1.

The computing hardware 102 is operable to execute one or more software products recorded on machine-readable data storage media. The computing hardware 102 may, for example, be implemented by way of one or more servers, and a load balancer to balance communicational and/or computational load on these servers. In some cases, the computing hardware 102 may be implemented by way of one or more image servers. Such image servers may be operable to perform image processing in addition to other server functions.

Optionally, one or more of the databases 104 may be implemented as Binary Large OBject (BLOB) databases that may store multimedia content, such as audio, video and images.

Moreover, the system 100 may be implemented in various ways, depending on various possible scenarios. In one example scenario, the system 100 may be implemented by way of a spatially collocated arrangement of the computing hardware 102 and the databases 104.

In another example scenario, the system 100 may be implemented by way of a spatially distributed arrangement of the computing hardware 102 and the databases 104 coupled mutually in communication via the data communication network 108.

In yet another example scenario, the computing hardware 102 and the databases 104 may be implemented via cloud computing services.

In still another example scenario, the computing hardware 102 and the databases 104 may be implemented via the computing devices 106. For example, the computing hardware 102 and the databases 104 may be implemented, at least in part, in the computing devices 106. In such a case, the system 100 may be implemented in a peer-to-peer (P2P) network in which various functionalities of the computing hardware 102 may be distributed between the computing devices 106.

The data communication network 108 couples the computing hardware 102 to the computing devices 106, and provides a communication medium between the computing hardware 102 and the computing devices 106 for exchanging data amongst themselves.

The data communication network 108 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), second generation (2G) telecommunication networks, third generation (3G) telecommunication networks, fourth generation (4G) telecommunication networks, and Worldwide Interoperability for Microwave Access (WiMAX) networks.

One or more of the computing devices 106 may be implemented as one or more portable computing devices. Examples of the computing devices 106 include, but are not limited to, mobile phones, smart phones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

Let us consider an example scenario in which the computing devices 106a, 106b and 106c are associated with a first user, a second user and a third user, respectively. Let us also consider that the computing hardware 102 is operable to receive instructions from the first user to process a plurality of images. The plurality of images may, for example, include at least one of:

(a) one or more images stored locally in the computing device 106a, (b) one or more images extracted from a third party database or service, such as Facebook, Twitter, Flickr, Instagram, Dropbox and Whatsapp, and/or (c) one or more images originating from image searches performed on an online search engine, such as Google.

Subsequently, the computing hardware 102 is operable to process the plurality of images, and combine the plurality of images to create a first montage in which the plurality of images are arranged in a mutually abutting manner (hereinafter referred to as 'the first montage of mutually abutting images' or 'the first montage'). The computing hardware 102 is then operable to arrange the first montage of mutually abutting images within a pre-defined geometrical spatial envelope.

Optionally, the computing hardware 102 may be operable to group the plurality of images into a plurality of clusters. One or more images may be grouped into a cluster, if the images satisfy pre-defined criteria. For example, the pre-defined criteria may include images created within a pre-defined time interval, such as a number of days, a week, a number of weeks, a month, and so on. The pre-defined criteria and the pre-defined time interval may be either user-defined or system-defined by default.

Subsequently, the computing hardware 102 may be operable to arrange images within each cluster in a mutually abutting manner. The computing hardware 102 may then be operable to arrange the clusters within the pre-defined geometrical spatial envelope to create the first montage.

The pre-defined geometrical spatial envelope may be either user-defined or system-defined by default. For example, the pre-defined geometrical spatial envelope may include at least one of: a spiral form, a heart form, a snake form, a symmetrical geometrical form, a user-defined form, a form generated by an image analysis algorithm (e.g. edge detection of hand-written or drawn shapes or patterns such as a company logo in an image), a 2-D form, and/or a 3-D form. An example of a 3-D form could be a helix form that could be viewed by the first user from various viewing angles.

In one example, the pre-defined geometrical spatial envelope may be any random form.

In another example, the pre-defined geometrical spatial envelope may be a user-controllable form. Accordingly, the computing hardware 102 may allow the first user to change a shape, size and/or form of the pre-defined geometrical spatial envelope during its generation and/or at a later time. For example, the first user may choose to steer through or turn at any point on the pre-defined geometrical spatial envelope.

In yet another example, the computing hardware 102 may allow the first user to replace an existing pre-defined geometrical spatial envelope with another geometrical spatial envelope.

In still another example, the computing hardware 102 may allow the first user to choose a suitable form to be used for the pre-defined geometrical spatial envelope. For example, the first user may upload a pattern to be used as a basis for the pre-defined geometrical spatial envelope. The pattern may, for example, include a character, a word or a phrase chosen by the first user, a signature of the first user, a freehand drawing made by the first user, a pattern read from an image by image analysis, and/or any random pattern chosen by the first user.

Moreover, the pre-defined geometrical spatial envelope may be formed in a manner that is visually conformable and optimal for human visual memory. Consequently, images may be located easily on the pre-defined geometrical spatial envelope based on human visual memory.

Beneficially, the plurality of images may be spatially distributed within the pre-defined geometrical spatial envelope as a function of their time of creation and/or their subject matter. Accordingly, the computing hardware 102 may be operable to record metadata associated with one or more images included in the first montage.

For example, metadata associated with an image may include information about at least one of: a geographical location where the image was created, a date and/or a time when the image was created, one or more persons to whom the image pertains, an event to which the image pertains, one or more objects captured in the image, a landmark captured in the image, a scenery and/or a season captured in the image.

In one example, the metadata may be defined by the first user using manual annotation. In another example, the computing hardware 102 may be operable to perform an automated image analysis to define the metadata. In yet another example, the metadata may be imported during extraction of the images from the third party database or service.

The computing hardware 102 may then be operable to store the metadata in at least one of the databases 104.

Moreover, the system 100 may be operable to host an image browser on the computing device 106a for allowing the first user to view the first montage. In one example, the image browser may be an image viewing application that may be run on the computing device 106a. In another example, the image browser may be an application that may be added-on to an existing web browser.

The image browser may enable zooming-in and zooming-out, when viewing the first montage. Beneficially, individual images of the first montage may be able to be viewed and manipulated by the first user within the first montage, when zooming-in. Details of how the image browser may be implemented have been provided in conjunction with FIGS. 3A, 3B, 3C and 4.

Beneficially, the system 100 may receive user instructions for zooming-in and zooming-out by way of a tactile gesture applied by the first user to a touch screen of the computing device 106a and/or by way of a user gesture as sensed by a camera of the computing device 106a.

Moreover, the system 100 is operable to manage the first montage effectively as a single file for purposes of storing in the databases 104, and/or accessing from the databases 104. Beneficially, the computing hardware 102 may be operable to cause the first montage to be stored as a single large file in at least one of the databases 104. This enables the first user to create a backup of the first montage easily. The computing hardware 102 may be operable to enable the computing device 106a to access the first montage from the at least one of the databases 104.

Beneficially, the computing hardware 102 may be operable to encode the montage 402 as per a suitable compression format. The compression format may, for example, be either lossless or lossy. This may reduce storage requirements during storing. This may also reduce amount of data to be transferred over the data communication network 108 during storing and/or accessing, namely, during creating and/or accessing a backup.

In a similar manner, the second user may provide instructions to the computing hardware 102 to process images pertaining to the second user and to combine the images to create a second montage of mutually abutting images. The system 100 may then be operable to manage the second montage effectively as a single file for purposes of storing in the databases 104, and/or accessing from the databases 104.

Additionally, the system 100 may allow the first user, the second user and the third user to share their respective montages or certain parts of their respective montages with each other. Let us consider, for example, that the first user invites the second user and the third user to view and/or update the first montage. For this purpose, the first user may send an invite to the second user and the third user by using electronic mails or a social networking service provided by the computing hardware 102. In order to implement the social networking service, information about various users may be stored in at least one of the databases 104. For example, information about the first user may include at least one of: an identification code (ID) associated with the first user, a name of the first user, a profile of the first user, and/or one or more montages created by the first user.

Moreover, the social networking service provided by the computing hardware 102 may be integrated with other social networking services, such as Facebook and Instagram.

Beneficially, the computing devices 106 may access various services provided by the computing hardware 102 using a secure connection.

In order to manage access rights to the first montage, the first user may provide information including at least one of: who may be allowed to view the first montage, who may be allowed to modify the first montage, and/or how the first montage may be modified. This information may then be stored in at least one of the databases 104.

For example, the computing hardware 102 may allow the second user and the third user to:
(a) access the first montage owned by the first user,
(b) rank images included in the first montage,
(c) update the first montage,
(d) create a new montage, and/or
(e) merge the new montage with the first montage owned by the first user.

In one example, the second user may update the first montage by way of addition or deletion of images. In another example, the second user may update the first montage by way of adding or modifying the metadata associated with the images included in the first montage. In yet another example, the second user may update the first montage by way of adding one or more comments to one or more of the images included in the first montage.

Moreover, newly added images and/or highly ranked images may be highlighted on the first montage, for example, by way of marking with a pre-defined symbol and/or by way of shining brighter and/or by way of a pre-defined animation effect. The pre-defined symbol may, for example, be a star-shaped symbol, an arrow, or any other suitable symbol. The pre-defined animation effect may, for example, be a glowing effect in which a border of an image may glow. The pre-defined symbol and/or the pre-defined animation effect may either be user-defined or system-defined by default.

Additionally, various portions of the first montage including images of interest to the first user may be highlighted on the pre-defined geometrical spatial envelope of the first montage. For example, a year when one or more images were created or a name of a person to whom the images pertain may be highlighted at an appropriate portion of the first montage, for example, by way of marking with the pre-defined symbol. This may assist the first user in navigating through the first montage.

Additionally, the computing hardware 102 may be operable to notify the first user, when a new image is added or a new montage is merged with the first montage. Details of how multiple montages may be merged together have been provided in conjunction with FIGS. 5A, 5B and 5C.

It should be noted here that the implementation of the system 100 is not limited to a specific type or number of computing hardware, databases, computing devices and communication networks. FIG. 1 is merely an example, which should not unduly limit the scope of the claims herein. One of ordinary skill in the art would recognize many variations, alternatives, and modifications of embodiments herein.

In one example, the system 100 may be implemented in a similar manner for processing video data, storing video data and accessing video data. In such a case, a video may be represented by its respective thumbnail. Accordingly, the computing hardware 102 may be operable to combine thumbnails of a plurality of videos to create a montage of mutually abutting thumbnails arranged within a pre-defined geometrical spatial envelope. The system 100 may be operable to manage the montage effectively as a single file for purposes of storing in the databases 104 and/or accessing from the databases 104.

In another example, the system 100 may be implemented in a similar manner for processing, storing and accessing audio files. In such a case, an audio file may be represented, for example, by a cover photo of an album to which the audio file belongs. Accordingly, the computing hardware 102 may be operable to group the audio files into a plurality of albums, such that one or more audio files belonging to a similar album and/or created during a pre-defined time interval may be grouped together. The computing hardware 102 may then be operable to create a montage of mutually abutting cover photos of these albums arranged within a pre-defined geometrical spatial envelope.

In yet another example, the system 100 may be implemented in a similar manner for processing, storing and accessing documents.

Figure 2:
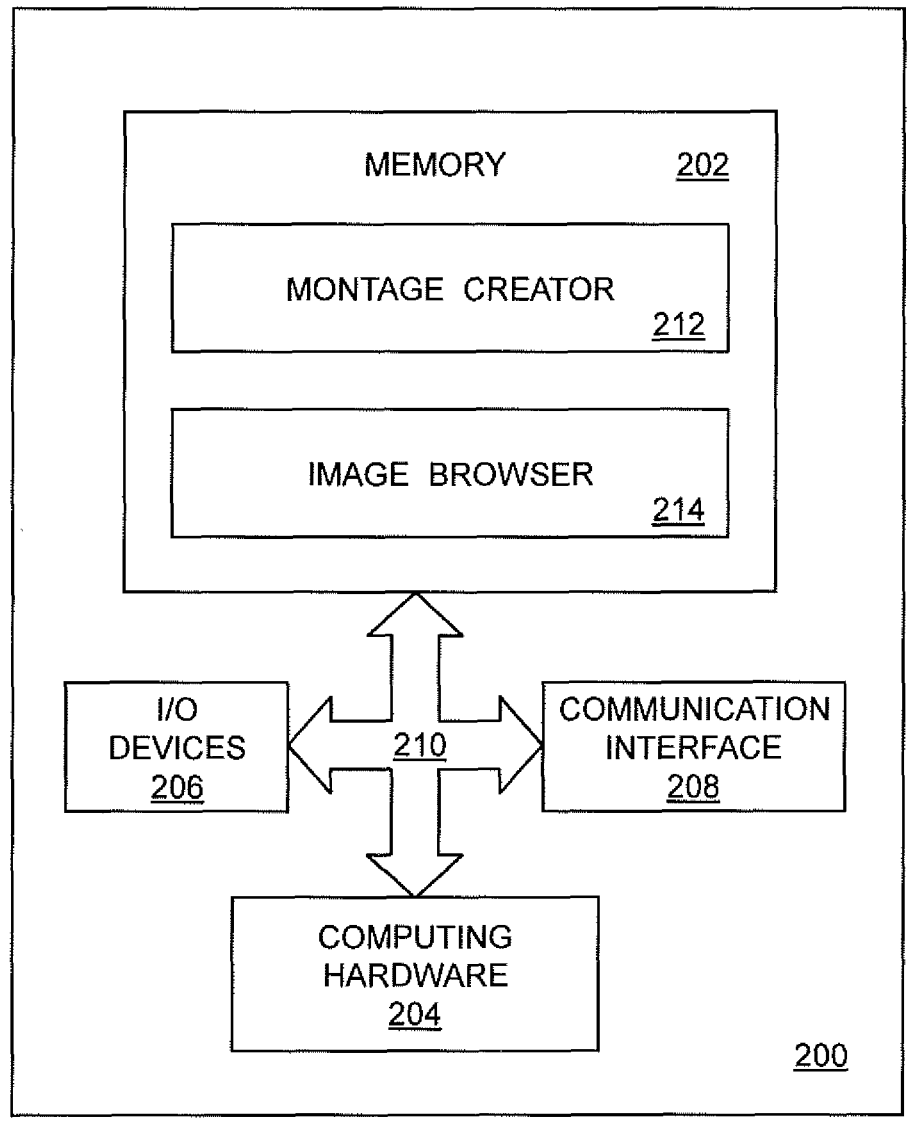
FIG. 2 is a schematic illustration of a system for processing image data, storing image data and accessing image data, in accordance with a second embodiment of the present disclosure.

FIG. 2 is a schematic illustration of a system for processing image data, storing image data and accessing image data, in accordance with a second embodiment of the present disclosure. The system may be implemented as a computing device 200. The computing device 200 includes, but is not limited to, a memory 202, computing hardware 204, Input/Output (I/O) devices 206, a communication interface 208 and a system bus 210 that operatively couples various components including the memory 202, the computing hardware 204, the I/O devices 206 and the communication interface 208.

The computing hardware 204 is operable to execute one or more software products recorded on machine-readable data storage media. The computing hardware 204 may, for example, include a processor. The software products may, for example, include a montage creator 212 and an image browser 214 stored in the memory 202.

In some cases, the computing device 200 may be a portable computing device. Examples of the computing device 200 include, but are not limited to, a mobile phone, a smart phone, an MID, a tablet computer, a UMPC, a phablet computer, a PDA, a web pad, a PC, a handheld PC, a laptop computer, a desktop computer, an NAS device, a large-sized touch screen with an embedded PC, and an interactive entertainment device, such as a game console, a TV set and an STB.

A user of the computing device 200 may select a plurality of images to be processed. The plurality of images may, for example, include at least one of:
(a) one or more images stored locally in an internal storage of the computing device 200,
(b) one or more images extracted from a third party database or service, such as Facebook, Twitter, Flickr, Instagram, Dropbox and Whatsapp, and/or
(c) one or more images originating from image searches performed on an online search engine, such as Google.

When executing the montage creator 212, the computing hardware 204 is operable to process the plurality of images, and combine the plurality of images to create a montage of mutually abutting images arranged within a pre-defined geometrical spatial envelope.

Optionally, the computing hardware 204 may be operable to group the plurality of images into a plurality of clusters. One or more images may be grouped into a cluster, if the images satisfy pre-defined criteria. For example, the pre-defined criteria may include images created within a pre-defined time interval, such as a number of days, a week, a number of weeks, a month, and so on. The pre-defined criteria and the pre-defined time interval may be either user-defined or system-defined by default.

Subsequently, the computing hardware 204 may be operable to arrange images within each cluster in a mutually abutting manner. The computing hardware 204 may then be operable to arrange the clusters within the pre-defined geometrical spatial envelope to create the montage of mutually abutting images.

The pre-defined geometrical spatial envelope may include at least one of: a spiral form, a heart form, a snake form, a symmetrical geometrical form, a user-defined form, a form generated by an image analysis algorithm (e.g. edge detection of hand-written or drawn shapes or patterns such as a company logo in an image), a 2-D form, and/or a 3-D form. An example of a 3-D form could be a helix form that could be viewed by the user from various viewing angles.

In one example, the pre-defined geometrical spatial envelope may be any random form.

In another example, the pre-defined geometrical spatial envelope may be a user-controllable form. Accordingly, the computing hardware 204 may allow the user to change a shape, size and/or form of the pre-defined geometrical spatial envelope during its generation and/or at a later time. For example, the user may choose to steer through or turn at any point on the pre-defined geometrical spatial envelope.

In yet another example, the computing hardware 204 may allow the user to replace an existing pre-defined geometrical spatial envelope with another geometrical spatial envelope.

In still another example, the computing hardware 204 may allow the user to choose a suitable form to be used for the pre-defined geometrical spatial envelope. For example, the user may upload a pattern to be used as a basis for the pre-defined geometrical spatial envelope. The pattern may, for example, include a character, a word or a phrase chosen by the user, a signature of the user, a freehand drawing made by the user, a pattern read from an image by image analysis, and/or any random pattern chosen by the user.

Moreover, the pre-defined geometrical spatial envelope may be formed in a manner that is visually conformable and optimal for human visual memory. Consequently, images may be located easily on the pre-defined geometrical spatial envelope based on human visual memory.

Beneficially, the plurality of images may be spatially distributed within the pre-defined geometrical spatial envelope as a function of their time of creation and/or their subject matter. Accordingly, the computing hardware 204 may be operable to record metadata associated with one or more images included in the montage.

For example, metadata associated with an image may include information about at least one of: a geographical location where the image was created, a date and/or a time when the image was created, one or more persons to whom the image pertains, an event to which the image pertains, one or more objects captured in the image, a landmark captured in the image, a scenery and/or a season captured in the image.

In one example, the metadata may be defined by the user using manual annotation. In another example, the computing hardware 204 may be operable to perform an automated image analysis to define the metadata. In yet another example, the metadata may be imported during extraction of the images from the third party database or service.

The computing hardware 204 may then be operable to store the metadata in the internal storage of the computing device 200.

Moreover, the computing device 200 is operable to host the image browser 214, which is stored in the memory 202, for allowing the user to view the montage. When executed on the computing hardware 204, the image browser 214 enables zooming-in and zooming-out, when viewing the montage.

Beneficially, individual images of the montage may be able to be viewed and manipulated by the user within the montage, when zooming-in. Details of how the image browser 214 may be implemented have been provided in conjunction with FIGS. 3A, 3B, 3C and 4.

Optionally, the computing device 200 may receive user instructions for zooming-in and zooming-out by way of a tactile gesture applied by the user to a touch screen coupled to the computing hardware 204 and/or by way of a user gesture as sensed by a camera coupled to the computing hardware 204. The touch screen and/or the camera may, for example, be one of the I/O devices 206 of the computing device 200.

Moreover, the computing device 200 is operable to manage the montage effectively as a single file for purposes of storing locally in the internal storage, and/or accessing locally from the internal storage. Beneficially, the computing hardware 204 may be operable to cause the montage to be stored locally as a single large file in the internal storage of the computing device 200. This enables the user to create a backup of the montage easily.

Additionally, various portions of the montage including images of interest to the user may be highlighted on the pre-defined geometrical spatial envelope of the montage. For example, a year when one or more images were created or a name of a person to whom the images pertain may be highlighted at an appropriate portion of the montage, for example, by way of marking with a pre-defined symbol. The pre-defined symbol may either be user-defined or system-defined by default. Such highlighting may assist the user in navigating through the montage. Additionally the montage can be shaped as symbol. For example the spiral or snake can make turns at a certain point that locally shapes the geometrical spatial envelope into a landmark that is formed out of the original images and visible when the montage is zoomed-out. Example of such symbol could be year "2013", a name "John", a place "Paris" or other similar landmark symbol.

Moreover, the communication interface 208 may allow the user to upload the montage to an external system that includes one or more servers and one or more databases. In one example, such servers and databases may be implemented via cloud computing services. In another example, the external system may be a social networking service.

Additionally, the communication interface 208 may allow the user to share the montage uploaded on the external system with other users. For example, the user may invite the other users to view and/or modify the montage.

In one example, the communication interface 208 may be a wired communication interface. In another example, the communication interface 208 may be a wireless communication interface that may implement Wi-Fi and/or Bluetooth ("Bluetooth" is a registered trademark). In some cases, the communication interface 208 may allow the user to share the montage with other users directly, for example, by way of Wi-Fi or Bluetooth communication.

FIG. 2 is merely an example, which should not unduly limit the scope of the claims herein. It is to be understood that the specific designation for the computing device 200 is for the convenience of reader and is not to be construed as limiting the computing device 200 to specific numbers, types, or arrangements of modules and/or components of the computing device 200. One of ordinary skill in the art would recognize many variations, alternatives, and modifications of embodiments of the present disclosure.

Figure 3A:
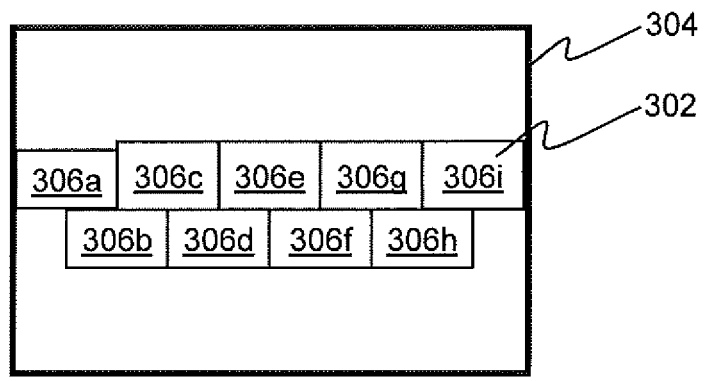
FIGS. 3A, 3B and 3C are schematic illustrations of various views of a montage in a first example scenario, when viewed in an image browser, in accordance with an embodiment of the present disclosure.
Figure 3B:
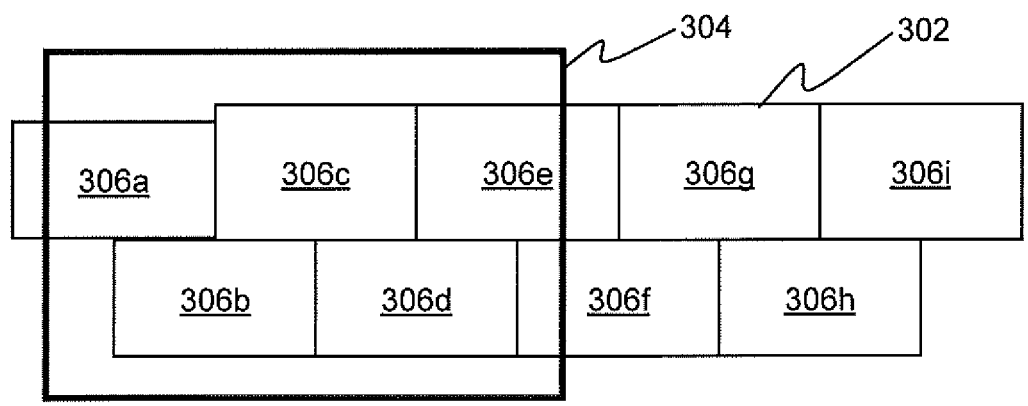
Figure 3C:
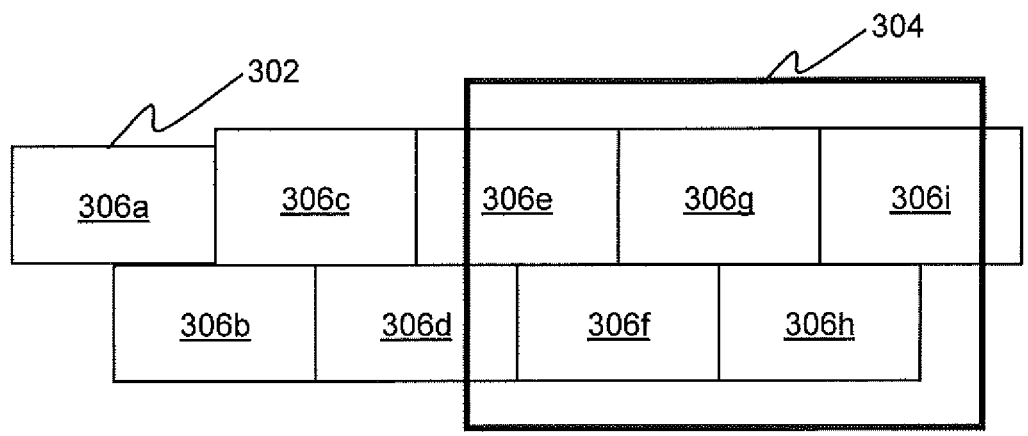

FIGS. 3A, 3B and 3C are schematic illustrations of various views of a montage 302 in a first example scenario, when viewed in an image browser 304, in accordance with an embodiment of the present disclosure. The image browser 304 may be displayed on a touch screen of a computing device. In a particular view, a portion of the montage 302 within a boundary of the image browser 304 is displayed on the touch screen and is visible to a user, while portions of the montage 302 outside the boundary of the image browser 304 are not displayed on the touch screen.

In the first example scenario, the montage 302 is created from a plurality of images, depicted as images 306a, 306b, 306c, 306d, 306e, 306f, 306g, 306h and 306i (hereinafter collectively referred to as images 306). The images 306 may have different aspect ratios, as shown in FIGS. 3A, 3B and 3C. In the montage 302, the images 306 are arranged in a mutually abutting manner irrespective of their aspect ratios.

The montage 302 is arranged within a pre-defined geometrical spatial envelope. In the first example scenario, the pre-defined geometrical spatial envelope is a 2-D wavelet form. The 2-D wavelet form may be extended when more images are added to the montage 302.

In the first example scenario, the images 306 have been spatially distributed within the pre-defined geometrical spatial envelope as a function of their time of creation. Accordingly, older images may be arranged towards right, while newer images may be arranged towards left. It may be noted here that the images 306 may be spatially distributed in any arbitrary manner. For example, in alternative example scenarios, images may be spatially distributed as a function of their subject matter including, for example, at least one of: their geographical location of creation, persons to whom the images pertain, events to which the images pertain, objects, landmarks, sceneries and/or seasons captured in the images.

As described earlier, the montage 302 may be managed effectively as a single file for purposes of storing in a database and/or accessing from the database. Accordingly, the montage 302 may be stored as a single large image, which may be zoomed in to view images 306 individually.

With reference to FIG. 3A, the image browser 304 displays the montage 302 in its entirety to the user.

The image browser 304 enables zooming-in to view individual images of the montage 302. With reference to FIG. 3B, the image browser 304 zooms-in to display a portion of the montage 302 that includes images 306a, 306b, 306c, 306d and 306e. The image browser 304 may further zoom-in to display one of the images 306, upon receiving user instructions.

As described earlier, user instructions for zooming-in and zooming-out may be received by way of a first tactile gesture applied by the user to the touch screen of the computing device, a first slider controlled by the user on the touch screen, and/or a first user gesture as sensed by a camera of the computing device.

In one example, the first tactile gesture may be a two-finger tactile gesture. For example, the user may apply the two-finger tactile gesture by his/her thumb and index finger on the touch screen.

In another example, the first tactile gesture may be a three-finger tactile gesture. For example, the user may apply the three-finger tactile gesture by touching the touch screen with three fingers.

In yet another example, the first tactile gesture may be a circular tactile gesture, a tapping gesture, a double-tapping gesture, or any other tactile gesture. For example, the user may apply the circular tactile gesture by making a circle using his/her index finger or a pointing device on the touch screen.

Additionally, zooming-in and zooming-out may be computer-controlled according to a pre-defined sequence. The image browser 304 may be operable to move from one image to another image according to the pre-defined sequence, for example, in case of a "screen-saver" mode or a "slide show" mode. The pre-defined sequence may, for example, be based on metadata of the images 306. The pre-defined sequence may be either user-defined or system-defined by default.

In additional example the user could control navigation in the "z-direction" i.e. through a plurality of image montages or enable/disable image layers e.g. highlighted areas, image analysis results, image metadata and/or "glowing" animations that are in top of montages in similar manner as in mapping applications "terrain"-layer/"traffic"-layer etc are in top of the map visualization. One possible tactile gesture for this could be three finger gesture.

In yet additional example user interface might have "area to area view mode". In said mode when the montage is zoomed-in to make a single/small group of original pictures or annotated area visible, tapping or double-tapping on the montage could snap/lock the view extent to the closest single/small group of images or annotated area. When this mode is active, swiping with a finger will move to the next single picture/small group of pictures, also still locked/snapped to the outer borders of the picture/area. The order in which pictures are displayed in this mode is determined by picture metadata, either hardware defined i.e time-of-capture or defined by the user. Pinch-zooming out will return to the regular zoom and pan mode.

Additionally, the image browser 304 enables sliding the montage 302. With reference to FIG. 3C, the image browser 304 slides the montage 302 towards left to display another portion of the montage 302 that includes images 306e, 306f, 306g, 306h and 306i.

User instructions for sliding through the montage 302 may be received by way of a second tactile gesture applied by the user to the touch screen of the computing device, a second slider controlled by the user on the touch screen, and/or a second user gesture as sensed by the camera of the computing device.

In one example, the second tactile gesture may be a one-finger tactile gesture or any other tactile gesture. The user may apply the second tactile gesture by swiping using his/her index finger or the pointing device on the touch screen. Such swiping may be made in various directions, such as horizontal, vertical and diagonal directions, to slide the montage 302 to display various portions of the montage 302.

Moreover, the image browser 304 allows the user to manipulate how the montage 302 may be displayed in various views.

For example, the user may rotate the montage 302 in clockwise and counter-clockwise directions. Optionally, the image browser 304 may snap the montage 302 to a view that may be perpendicular to a previous view.

In this manner, the image browser 304 allows the user to navigate through the montage 302, while the 2-D wavelet form serves as a visual guide when navigating through the montage 302.

Additionally, the image browser 304 may allow the user to add metadata to individual images or a group of images.

FIGS. 3A, 3B and 3C are merely examples, which should not unduly limit the scope of the claims herein. One of ordinary skill in the art would recognize many variations, alternatives, and modifications of embodiments of the present disclosure.

Figure 4:
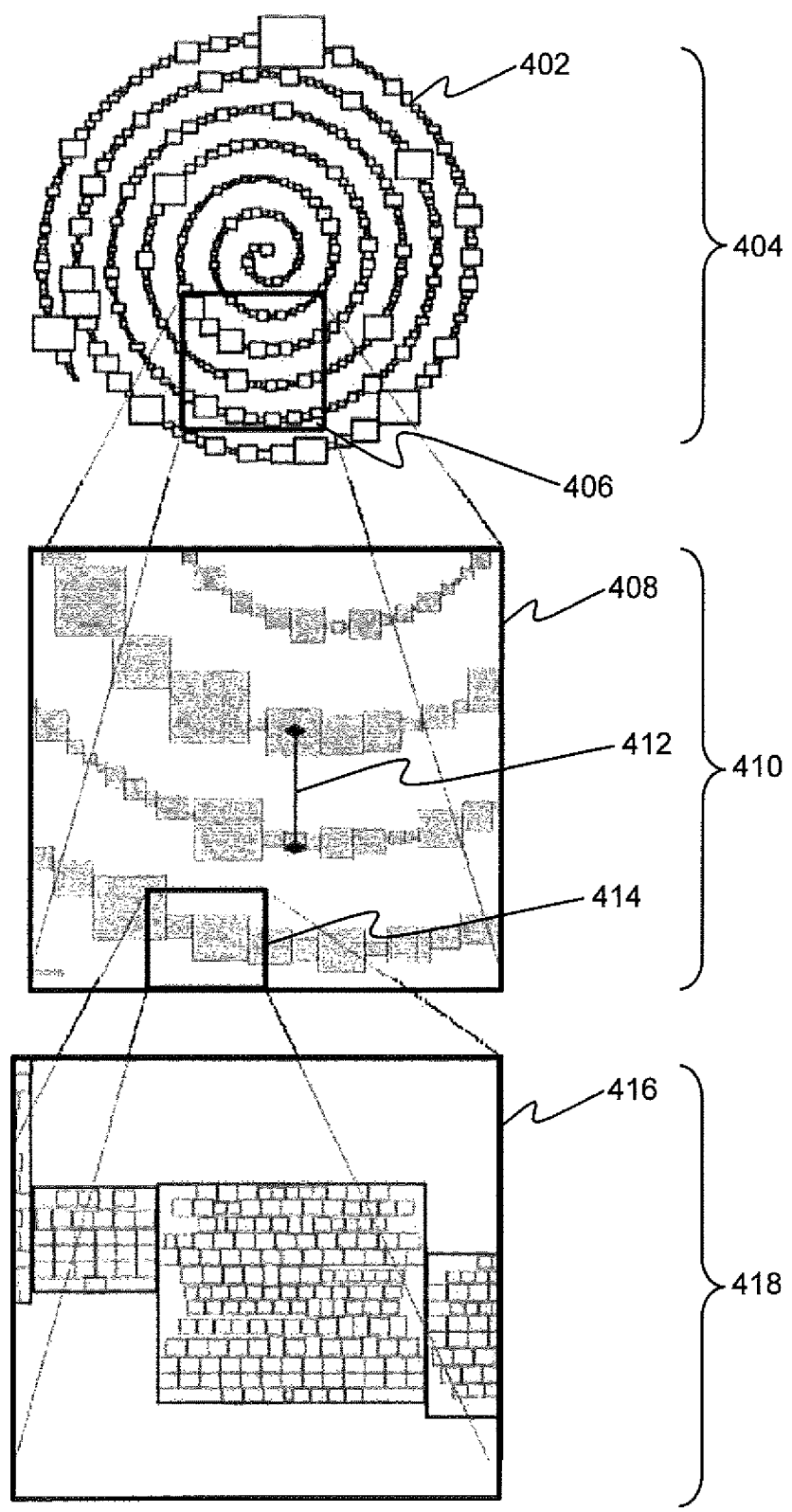
FIG. 4 is a schematic illustration of a montage in a second example scenario, in accordance with an embodiment of the present disclosure.

FIG. 4 is a schematic illustration of a montage 402 in a second example scenario, in accordance with an embodiment of the present disclosure. The montage 402 may be viewed in an image browser displayed on a touch screen of a computing device.

In the second example scenario, the montage 402 has been created from thousands of images. In order to create the montage 402, the images have been grouped into clusters. One or more images may be grouped into a cluster, if the images satisfy pre-defined criteria. For example, the pre-defined criteria may include images created within a pre-defined time interval, such as a number of days, a week, a number of weeks, a month, and so on. The pre-defined criteria and the pre-defined time interval may be either user-defined or system-defined by default.

The images are arranged in a mutually abutting manner within each cluster. The montage 402 is created by arranging the clusters within a pre-defined geometrical spatial envelope. In the second example scenario, the pre-defined geometrical spatial envelope is a spiral form, as displayed in a first view 404 on the image browser. The spiral form may, for example, be implemented as an Archimedean spiral. The Archimedean spiral has been known to be visually conformable and optimal for human vision.

The Archimedean spiral may, for example, be represented by a polar equation as follows:

$$r = a + b\theta^{(1/n)},$$

where 'r' is a radical distance from a centre of the Archimedean spiral,
'θ' is a polar angle,
'n' is a constant that determines how tightly the Archimedean spiral is wrapped,
'a' is a constant that determines how the Archimedean spiral is turned, and
'b' is a constant that determines a distance between successive turnings of the Archimedean spiral.

Beneficially, suitable values for the constants 'n', 'a' and 'b' may be calculated or defined, before creating the montage 402. For example, the distance between successive turnings (i.e., a value of 'b') may depend on input received from a user, such as the user's preference on how spacious the spiral form should be, and/or the pre-defined criteria for grouping the images into the clusters.

Beneficially, the distance between successive turnings may be large enough to allow a visually conformable arrangement of the clusters within a region between the successive turnings. However, it may be noted here that an unnecessarily large distance between successive turnings may result in an unnecessarily large montage, thereby making navigation through the montage more laborious.

In one example, the distance between successive turnings may be adjusted automatically depending on sizes of the clusters in the montage 402. Accordingly, a maximum size or a mean size or a median size or a combination thereof may be used to automatically adjust the distance between successive turnings. In some cases, the maximum size alone or in combination with the mean or median size may be used to automatically adjust the distance between successive turnings. In other cases, the mean or median size may be used to automatically adjust the distance between successive turnings. In such cases, large clusters may be extended along a curve of the spiral form, in order to fit between successive turnings.

In another example, the distance between successive turnings may be set to a pre-defined value. Accordingly, a length, a width and/or a shape of the cluster may be adjusted according to the pre-defined value. For example, larger clusters may be extended along the curve of the spiral form, in order to fit according to the pre-defined value.

Moreover, the images and the clusters may be spatially distributed within the spiral form as a function of their time of creation. Accordingly, older images may be arranged towards a centre of the spiral form, while newer images may be arranged towards a periphery of the spiral form. It may be noted here that the images may be spatially distributed in any arbitrary manner.

As described earlier, the montage 402 may be managed effectively as a single file for purposes of storing in a database and/or accessing from the database. Accordingly, the montage 402 may be stored as a single large image, which may be zoomed in to view the clusters and the images individually.

In the first view 404, the image browser displays the montage 402 in its entirety to the user. With reference to FIG. 4, the image browser zooms-in to a portion 406 of the first view 404, and displays a zoomed-in portion 408 in a second view 410.

The portion 406 may, for example, have been selected by the user by way of a tactile gesture applied by the user to the touch screen of the computing device. As described earlier, the tactile gesture may be a two-finger tactile gesture, a three-finger tactile gesture, a circular tactile gesture or any other tactile gesture. Alternatively, zooming-in and zooming-out may be computer-controlled according to a pre-defined sequence, for example, in case of a "screen-saver" mode or a "slide show" mode.

In the second view 410, the image browser displays some of the clusters of the montage 402 arranged within the spiral form. A two-way arrow 412 depicts a distance between two successive turnings of the spiral form.

With reference to FIG. 4, the image browser zooms-in to a portion 414 of the second view 410, and displays a zoomed-in portion 416 in a third view 418. The portion 414 may, for example, be selected by the user by way of the tactile gesture applied by the user to the touch screen of the computing device.

In the third view 418, the image browser displays images within few of the clusters of the montage 402.

In this manner, the image browser may allow the user to zoom-in repeatedly till one of the images of the montage 402 is displayed. Additionally, the image browser may allow the user to zoom-out from one view to another.

Additionally, the image browser may allow the user to slide the montage 402 in any direction and/or rotate the montage 402 in clockwise and counter-clockwise directions. In this manner, the image browser may allow the user to navigate through the montage 402, while the spiral form serves as a visual guide when navigating through the montage 402.

Furthermore, let us consider an example scenario in which the computing device is one of the computing devices 106, and the montage 402 is stored in the databases 104. In order to avoid latency in accessing the montage 402 from the databases 104, the montage 402 may be split into image tiles, for example, in a manner that is similar to "map" and "satellite" modes of (geographical) mapping applications. This splitting of montage 402 into image tiles can be implemented for example by server software that would generate tiles in real-time or close to real-time from the montage. The tiles would be served to the image browser or organized as a set of pre-prepared tiles for different zoom-levels. Example of zoom-levels could be tile pyramid structure.

Accordingly, the montage 402 may include a plurality of layers corresponding to various zoom levels. Each layer may include a plurality of tiles and metadata related to the plurality of tiles.

When displaying various portions of the montage 402 at the various zoom levels, only a required set of tiles may be downloaded to the computing device. Beneficially, the image data for the current field-of-view of the user may be downloaded to the computing device using a suitable streaming protocol, such as Real Time Streaming Protocol (RTSP).

For example, when displaying the first view 404 on the image browser, only a required resolution of the tiles of the montage 402 may be downloaded to the computing device, depending on a pixel resolution of the touch screen. As the user zooms-in from the first view 404 to the second view 410, more detailed resolution of one or more tiles pertaining to the zoomed-in portion 408 may be downloaded to the computing device.

When displaying the third view 418 on the image browser, even more detailed resolution of one or more tiles pertaining to the zoomed-in portion 416 may be downloaded to the computing device. In this manner, only a required resolution of one or more tiles pertaining to a current view may be downloaded to the computing device. This reduces communicational load on the data communication network 108.

Moreover, the computing device may be configured to store all or some of resolutions of the tiles of the montage 402, depending on an internal storage available in the computing device.

FIG. 4 is merely an example, which should not unduly limit the scope of the claims herein. One of ordinary skill in the art would recognize many variations, alternatives, and modifications of embodiments of the present disclosure.

Figure 5A:
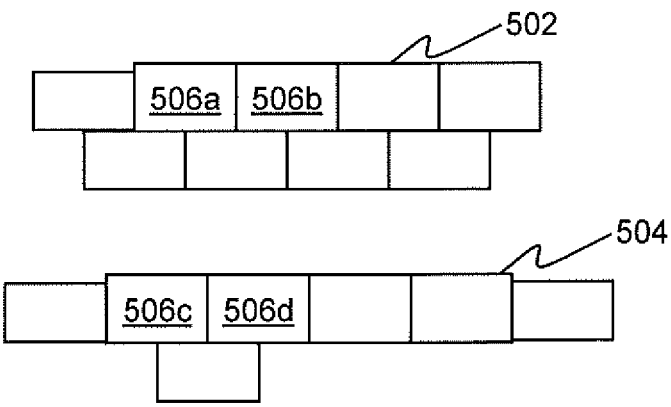
FIGS. 5A, 5B and 5C are schematic illustrations of how a first montage may be merged with a second montage, in accordance with an embodiment of the present disclosure.
Figure 5B:
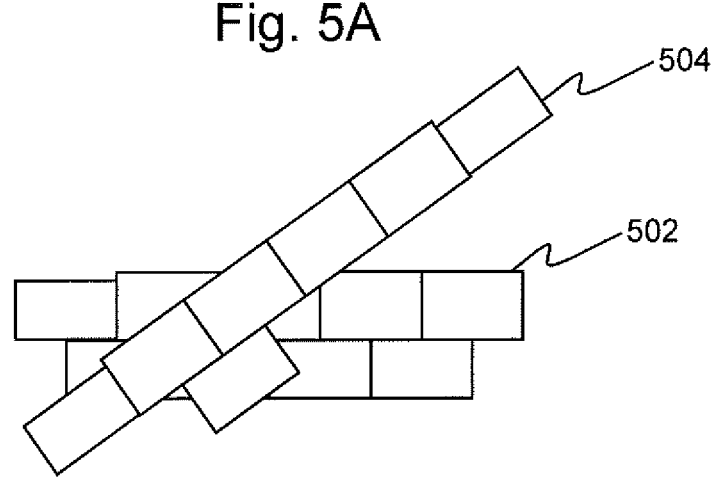
Figure 5C:
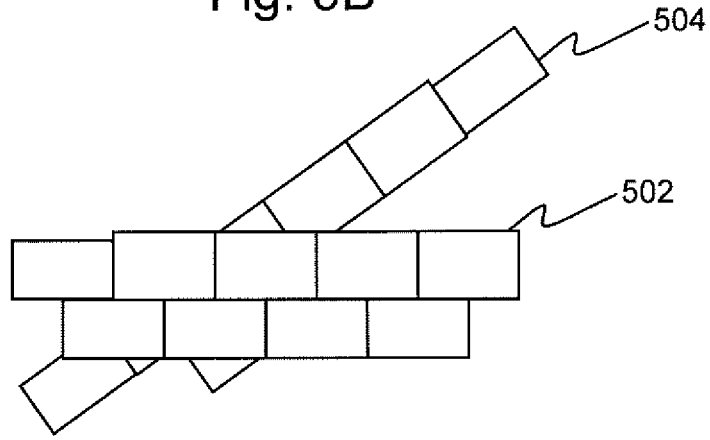

FIGS. 5A, 5B and 5C are schematic illustrations of how a first montage 502 may be merged with a second montage 504, in accordance with an embodiment of the present disclosure. With reference to FIG. 5A, the first montage 502 includes nine images, while the second montage 504 includes seven images.

In order to merge the first montage 502 and the second montage 504 together, one or more images of the first montage 502 related to one or more images of the second montage 504 may be identified. In one example, these images may be related if they have substantially similar metadata, which may include their time of creation and/or their subject matter.

In another example, these images may be related if they show substantially similar faces, objects, and/or places. Accordingly, a suitable pattern recognition method or a suitable face recognition method may be employed for purposes for finding related images.

In yet another example, these images may be related if they show faces of users who own the first montage 502 and the second montage 504 together.

Let us consider, for example, that images 506a and 506b of the first montage 502 are related to images 506c and 506d of the second montage 504. Accordingly, the first montage 502 and the second montage 504 may be merged together by overlapping a portion of the first montage 502 that include the images 506a and 506b with a portion of the second montage 504 that includes the images 506c and 506d.

With reference to FIG. 5B, the first montage 502 has been shown below the second montage 504, after merging then together to form a single merged montage. With reference to FIG. 5C, the first montage 502 has been shown above the second montage 504.

FIGS. 5A, 5B and 5C are merely examples, which should not unduly limit the scope of the claims herein. One of ordinary skill in the art would recognize many variations, alternatives, and modifications of embodiments of the present disclosure.

FIGS. 6A, 6B, 6C and 6D are schematic illustrations of various views of the single merged montage, when viewed in an image browser 602, in accordance with an embodiment of the present disclosure. The image browser 602 may be displayed on a touch screen of a computing device. In a particular view, a portion of the single merged montage within a boundary of the image browser 602 is displayed on the touch screen and is visible to a user, while portions of the single merged montage outside the boundary of the image browser 602 are not displayed on the touch screen.

Figure 6A:
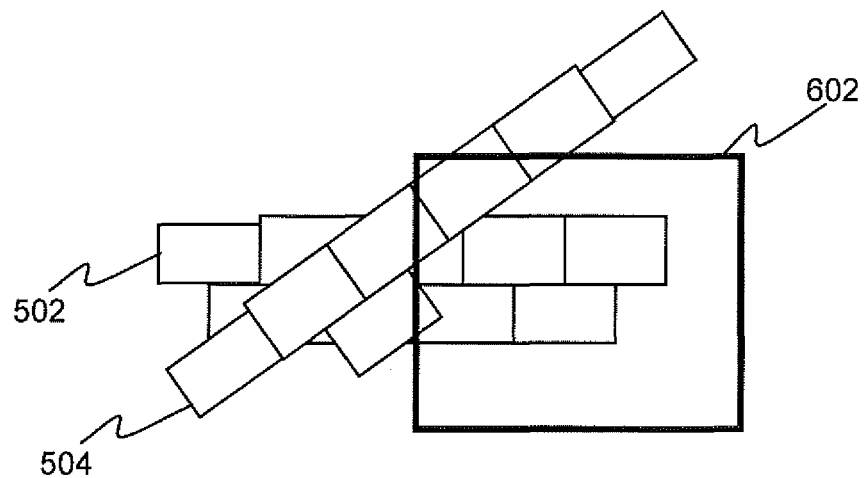
FIGS. 6A, 6B, 6C and 6D are schematic illustrations of various views of a single merged montage, when viewed in an image browser, in accordance with an embodiment of the present disclosure.

With reference to FIG. 6A, the image browser 602 displays a first portion of the single merged montage to a user. The first portion displays some images of the first montage 502.

Figure 6B:
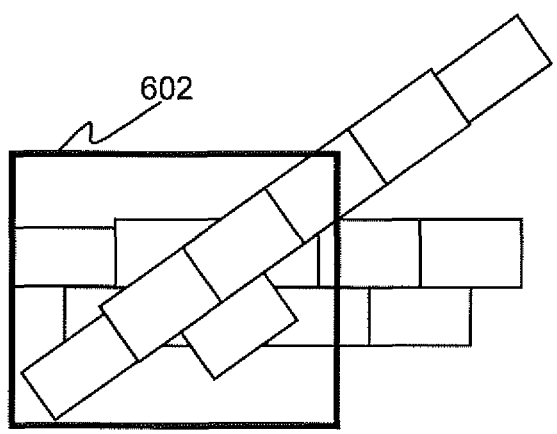

The image browser 602 allows the user to slide the single merged montage in any direction. With reference to FIG. 6B, the image browser 602 slides the single merged montage towards right to display a second portion of the single merged montage. The second portion displays the portions of the first montage 502 and the second montage 504 that were overlapped together to form the single merged montage.

Figure 6C:
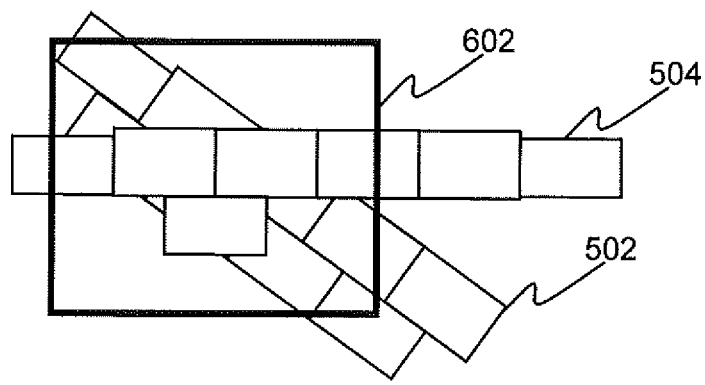

Additionally, the image browser 602 allows the user to rotate the single merged montage in clockwise and counter-clockwise directions. With reference to FIG. 6C, the image browser 602 rotates the single merged montage in a clockwise direction, and displays a third portion of the single merged montage.

Figure 6D:
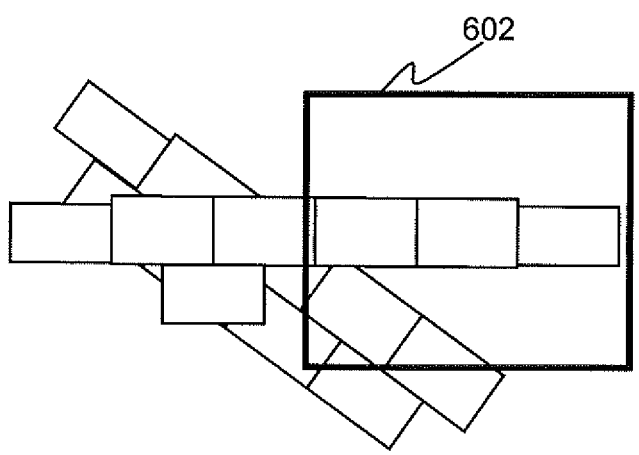

With reference to FIG. 6D, the image browser 602 slides the single merged montage towards left to display a fourth portion of the single merged montage. The fourth portion displays some images of the second montage 504.

Moreover, the image browser 602 allows the user to slide up, slide down, zoom-in and zoom-out. In this manner, the image browser 602 allows the user to navigate through the single merged montage.

FIGS. 6A, 6B, 6C and 6D are merely examples, which should not unduly limit the scope of the claims herein. One of ordinary skill in the art would recognize many variations, alternatives, and modifications of embodiments of the present disclosure.

Figure 7A:
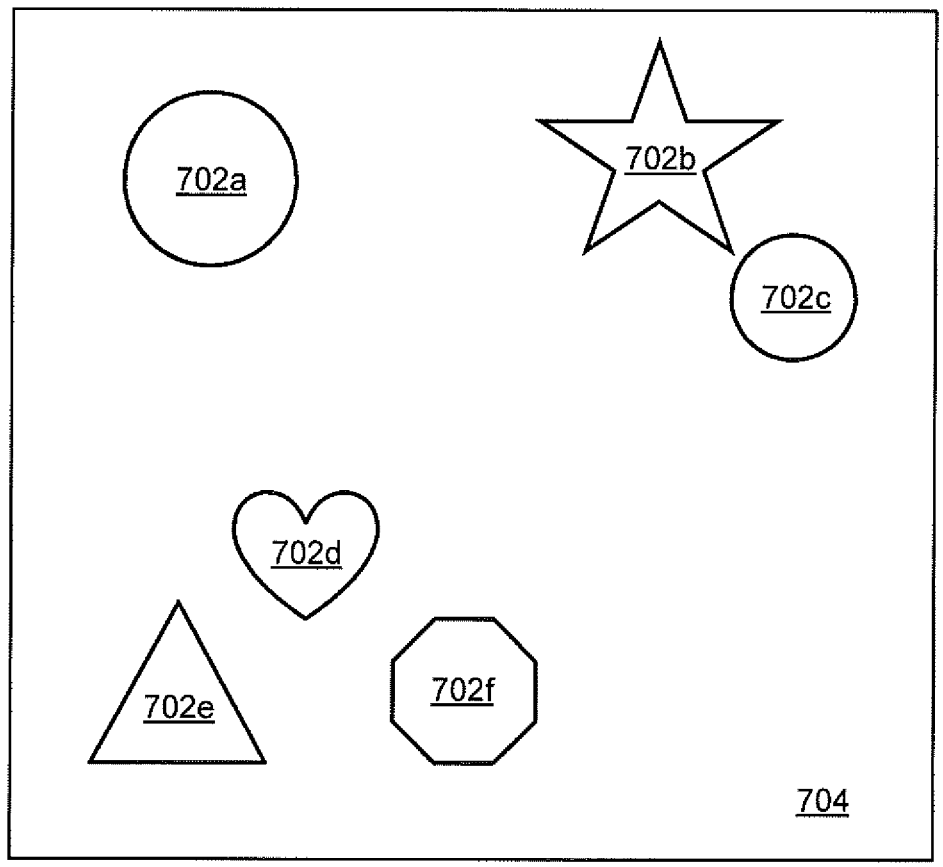
FIGS. 7A and 7B are schematic illustrations of how a plurality of montages may be organized, in accordance with an embodiment of the present disclosure.
Figure 7B:
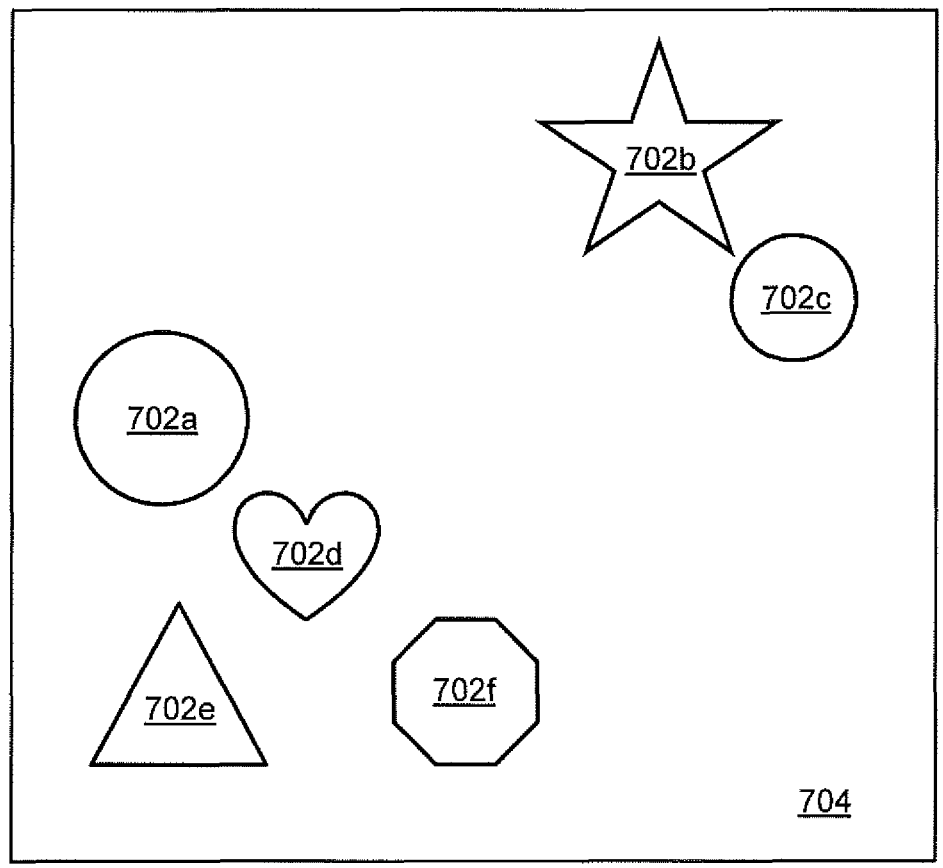

FIGS. 7A and 7B are schematic illustrations of how a plurality of montages may be organized, in accordance with an embodiment of the present disclosure. The plurality of montages have been depicted as montages 702a, 702b, 702c, 702d, 702e and 702f (hereinafter collectively referred to as montages 702). The montages 702 are displayed in an image browser 704.

In one example scenario, the montages 702 may be shared by various users, for example, using the social networking service provided by the computing hardware 102. In another example scenario, the montages 702 may be stored locally in the internal storage of the computing device 200.

With reference to FIG. 7A, the montages 702 are arranged relative to each other in the image browser 704, based on similarity indices between the montages 702. A similarity index between a first montage and a second montage may, for example, be calculated by comparing metadata of images included in the first and second montages. A higher value of the similarity index implies a higher probability that the first montage includes one or more images that are substantially similar to one or more images in the second montage.

The similarity indices may be calculated for each pair of montages. The similarity indices may then be used to organize the montages 702, such that a particular montage is placed in proximities of other montages similar to that particular montage. For example, two montages with a similarity index greater than a pre-defined threshold value may be placed in proximities of each other. The pre-defined threshold value may be either user-defined or system-defined by default.

With reference to FIG. 7A, the montages 702b and 702c have a high similarity index, and therefore, are placed in proximities of each other. The montages 702d, 702e and 702f have high similarity indices, and therefore, are placed in proximities of each other. The montage 702a has low similarity indices with the montages 702b, 702c, 702d, 702e and 702f, and therefore, is placed away from the montages 702b, 702c, 702d, 702e and 702f.

Additionally, the montages 702 may be organized in a manner that distances between montages with higher similarity indices may be smaller, while distances between montages with lower similarity indices may be larger.

Optionally, the montages 702 may be organized in a manner that a merged montage may be surrounded by a plurality of montages from which the merged montage was created.

In an alternative embodiment of the present disclosure, montages or images in the montages that have high similarity indices may be joined by lines or arches.

Let us consider, for example, that at a later time, one or more new images are added to the montage 702a, and these new images have substantially similar metadata to one or more images in the montage 702d. Consequently, the montage 702a may be moved closer to the montage 702d, as shown in FIG. 7B.

Optionally, the montage 702a may be moved closer to a portion of the montage 702d, which includes the images that are substantially similar to the new images of the montage 702a. Alternatively, the montage 702a may be moved closer to the montage 702d along a hypothetical line joining the montages 702a and 702d.

Additionally, while moving montages closer to each other, a weight ratio between the montages may be calculated. The weight ratio may, for example, be calculated based on sizes of the montages and/or numbers of images included in the montages. For example, a heavier montage may remain at its place, while a lighter montage is moved closer to the heavier montage.

FIGS. 7A and 7B are merely examples, which should not unduly limit the scope of the claims herein. One of ordinary skill in the art would recognize many variations, alternatives, and modifications of embodiments of the present disclosure.

In one example, montages may be arranged relative to each other based on relationship between users who created these montages, for example, derived from social network status or manual annotations. In another example, the montages may be arranged in a manner that most viewed montages may be arranged in a proximity of a montage created by a user. In yet another example, the montages may be arranged based on a user-customized arrangement, for example, where the user may drag montages of his/her friends to arbitrary positions.

Figure 8:
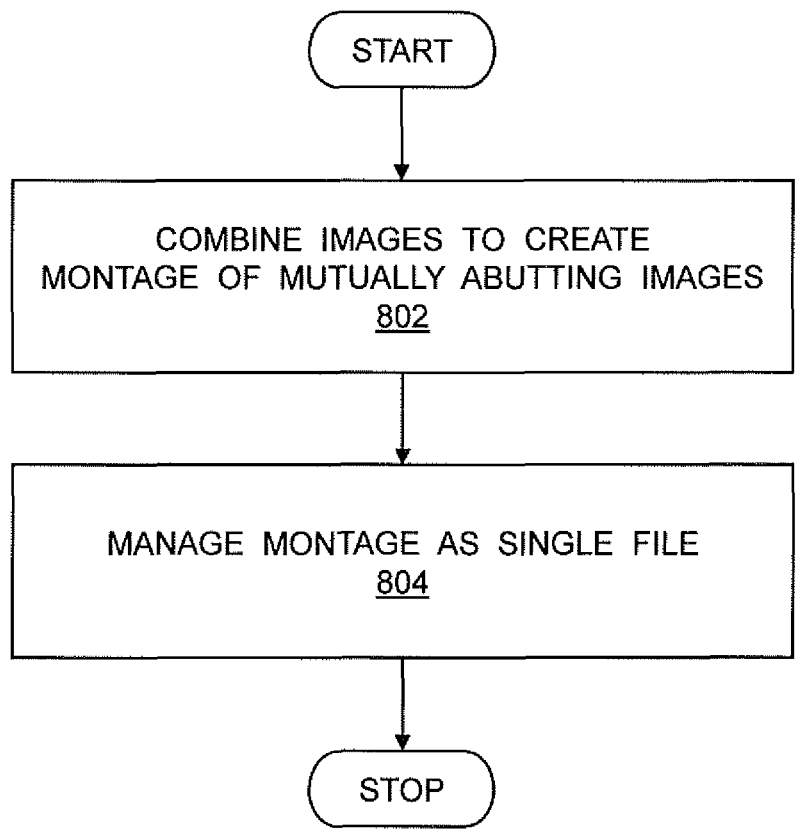
FIG. 8 is an illustration of steps of a method of using a system for processing image data, storing image data and accessing image data, in accordance with an embodiment of the present disclosure.

FIG. 8 is an illustration of steps of a method of using a system for processing image data, storing image data and accessing image data, in accordance with an embodiment of the present disclosure. The method is depicted as a collection of steps in a logical flow diagram, which represents a sequence of steps that can be implemented in hardware, software, or a combination thereof.

The system includes computing hardware that is operable to execute one or more software products recorded on machine-readable data storage media, and one or more databases for storing image information.

At a step 802, the computing hardware operates to combine a plurality of images to create a montage of mutually abutting images arranged within a pre-defined geometrical spatial envelope.

As described earlier, the pre-defined geometrical spatial envelope may include at least one of: a spiral form, a heart form, a snake form, a symmetrical geometrical form, a user-defined form, a form generated by an image analysis algorithm (e.g. edge detection of hand-written or drawn shapes or patterns such as a company logo in an image), a 2-D form, and/or a 3-D form. Optionally, the pre-defined geometrical spatial envelope may be any random form. Optionally, the pre-defined geometrical spatial envelope may be a user-controllable form.

Moreover, the pre-defined geometrical spatial envelope may be formed in a manner that is visually conformable and optimal for human visual memory.

In accordance with the step 802, the computing hardware may operate to spatially distribute the plurality of images within the pre-defined geometrical spatial envelope as a function of their time of creation and/or their subject matter, as described earlier. Accordingly, the computing hardware may operate to record metadata associated with one or more images included in the montage.

Next, at a step 804, the computing hardware operates to manage the montage effectively as a single file for purposes of storing in the databases and/or accessing from the databases.

The method may include an additional step at which the system operates to host an image browser. The image browser may enable zooming-in and zooming-out when viewing the montage, so that individual images of the montage are able to be viewed and manipulated by a user within the montage when zooming-in.

The method may include another additional step in which the system operates to receive user instructions for zooming-in and zooming-out by way of a tactile gesture applied by the user to a touch screen coupled to the computing hardware and/or by way of a user gesture as sensed by a camera coupled to the computing hardware.

It should be noted here that the steps 802 to 804 are only illustrative and other alternatives can also be provided where one or more steps are added, one or more steps are removed, or one or more steps are provided in a different sequence without departing from the scope of the claims herein.

Embodiments of the present disclosure can be used for various purposes, including, though not limited to, enabling users to create a montage of mutually abutting images, and to manage the montage as a single large file, thereby enabling the user to create a backup of the montage easily; facilitates access to the montage by downloading only a required resolution of tiles pertaining to a current view, thereby reducing communicational load; and enables users to update, merge and/or organize existing montages easily.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A system for processing image data, storing the image data and accessing the image data, wherein the system includes computing hardware that is operable to execute one or more software products recorded on machine-readable data storage media, and one or more databases in communication with the computing hardware for storing the image data,
wherein the computing hardware, upon receiving user instructions, is configured to:
combine a plurality of images to create an image cluster,
create a montage including a plurality of mutually abutting image clusters, the plurality of mutually abutting clusters being arranged along a path of a pre-determined shape, wherein each cluster along the path comprises a group of images, and
wherein each cluster in the montage of mutually abutting clusters of images is positioned along the path based on one or more of a time of creation of the cluster and a subject matter of the cluster;
wherein the system is operable to manage the montage effectively as a single file for purposes of storing the single file in the one or more databases, and/or accessing the single file from the one or more databases; and
wherein the computing hardware is configured to arrange each image cluster in the plurality of image clusters to include at least two side surfaces that are not mutually abutting with another image cluster.

2. The system as claimed in claim 1, wherein the system is operable to host an image browser that enables zooming-in and zooming-out when viewing the montage, so that individual images of the montage are able to be viewed and manipulated by a user within the montage when zooming-in.

3. The system as claimed in claim 2, wherein the system receives user instructions for zooming-in and zooming-out by way of a tactile gesture applied by the user to a touch screen coupled to the computing hardware and/or by way of a user gesture as sensed by a camera coupled to the computing hardware.

4. The system as claimed in claim 1, wherein the pre-defined geometrical spatial envelope includes at least one of: a spiral form, a heart form, a snake form, a symmetrical geometrical form, a user-defined form, a form generated by an image analysis algorithm, a 2-D form, and/or a 3-D form.

5. The system according to claim 4, wherein the computing hardware is configured to position each image cluster along the path of the plurality of image clusters to maintain a pre-determined spacing between different spirals of the spiral form.

6. The system as claimed in claim 1, wherein the system is implemented by way of at least one of: a spatially collocated arrangement of the computing hardware and the one or more databases, a spatially distributed arrangement of the computing hardware and the one or more databases coupled mutually in communication via a data communication network, via cloud computing services, and/or via users' portable computing devices.

7. The system as claimed in claim 1, wherein the computing hardware is operable to record metadata associated with one or more images included in the montage.

8. The system according to claim 1, wherein the computing hardware is further configured to arrange an image cluster in the plurality of image clusters to abut only an immediately prior image cluster along the path and an immediately next image cluster along the path.

9. The system according to claim 1, wherein the computing hardware is configured to arrange each image cluster along the path of image clusters to mutually abut only two other image clusters along the path and to maintain a pre-determined spacing away from other image clusters along the path.

10. The system according to claim 1, wherein the computing hardware is configured to arrange a position of each image cluster in the plurality of image clusters along the path to abut one or more of an immediately preceding positioned image cluster and an immediately subsequent positioned image cluster and be separated from other image clusters along the path.

11. A method of using a system for processing image data, storing the image data and accessing the image data, wherein the system includes computing hardware that is operable to execute one or more software products recorded on non-transitory machine-readable data storage media, and one or more databases in communication with the computing hardware for storing image information, wherein the method includes:
(a) operating the computing hardware, upon receiving user instructions, to combine a plurality of images to create an image cluster, combine different image clusters to create a montage of mutually abutting image clusters, where each image cluster comprises a group of images, the image clusters being arranged within a pre-defined geometrical spatial envelope along a path that forms a pre-determined shape, and each image cluster is positioned along the path based on one or more of a time of creation of the image cluster and a subject matter of the image cluster, and wherein the computing hardware is configured to arrange each image cluster in the plurality of image clusters to include at least two side surfaces that are not mutually abutting with another image cluster; and
(b) operating the system to manage the montage effectively as a single file for purposes of storing the single file in the one or more databases, and/or accessing the single file from the one or more databases.

12. The method as claimed in claim 11, wherein the method includes operating the system to host an image browser that enables zooming-in and zooming-out when viewing the montage, so that individual images of the montage are able to be viewed and manipulated by a user within the montage when zooming-in.

13. The method as claimed in claim 12, wherein the method includes operating the system to receive user instructions for zooming-in and zooming-out by way of a tactile gesture applied by the user to a touch screen coupled to the computing hardware and/or by way of a user gesture as sensed by a camera coupled to the computing hardware.

14. The method as claimed in claim 11, wherein the method includes arranging for the pre-defined geometrical spatial envelope to include at least one of: a spiral form, a heart form, a snake form, a symmetrical geometrical form, a user-defined form, a form generated by an image analysis algorithm, a 2-D form, and/or a 3-D form.

15. The method as claimed in claim 11, wherein the method includes implementing the system by way of at least one of: a spatially collocated arrangement of the computing hardware and the one or more databases, a spatially distributed arrangement of the computing hardware and the one or more databases coupled mutually in communication via a data communication network, via cloud computing services, and/or via users' portable computing devices.

16. The method as claimed in claim 11, wherein the method includes operating the computing hardware to record metadata associated with one or more images included in the montage.

17. A non-transitory machine readable data storage media on which machine readable instructions are stored, the machine readable instructions, when executed upon computing hardware are configured to:
combine a plurality of images to create an image cluster;
combine different image clusters into a montage of mutually abutting image clusters, where each image cluster comprises a group of images, the image clusters arranged within a pre-defined geometrical spatial envelope along a path that forms a pre-determined shape and wherein each image cluster in the montage of mutually abutting image clusters is positioned along the path based on one or more of a time of creation of the image cluster and a subject matter of the image cluster, arrange each image cluster in the plurality of image clusters to include at least two side surfaces that are not mutually abutting with another image duster; and
manage the montage effectively as a single file for purposes of storing the single file in the one or more databases, and/or accessing the single file from the one or more databases.

18. The system of claim 17, wherein the path comprises a spiral path having a number of spiral turns.

19. The system of claim 18, wherein the number of spiral turns of the spiral path increases as the number of images added to the spiral path increases.

* * * * *